United States Patent
Sjöqvist (10) Patent No.: US 9,003,812 B2
(45) Date of Patent: Apr. 14, 2015

(54) SUPPORTING STRUCTURE FOR A GAS TURBINE ENGINE

(75) Inventor: Roger Sjöqvist, Trollhättan (SE)

(73) Assignee: GKN Aerospace Sweden AB, Trollhattan (SE)

( * ) Notice: Subject to any disclaimer, the term of this patent is extended or adjusted under 35 U.S.C. 154(b) by 827 days.

(21) Appl. No.: 13/319,114

(22) PCT Filed: May 8, 2009

(86) PCT No.: PCT/SE2009/000237
§ 371 (c)(1),
(2), (4) Date: Nov. 30, 2011

(87) PCT Pub. No.: WO2010/128900
PCT Pub. Date: Nov. 11, 2010

(65) Prior Publication Data
US 2012/0111023 A1    May 10, 2012

(51) Int. Cl.
*F02C 7/20* (2006.01)
*F03B 11/02* (2006.01)
*F01D 25/28* (2006.01)
*F03B 1/04* (2006.01)
*F01D 9/04* (2006.01)
*F01D 25/24* (2006.01)

(52) U.S. Cl.
CPC ..... *F01D 25/28* (2013.01); *F01D 9/04* (2013.01); *F01D 25/24* (2013.01); *F02C 7/20* (2013.01); *Y02T 50/673* (2013.01); *F05D 2240/301* (2013.01)

(58) Field of Classification Search
USPC ........... 60/796–798; 415/213.1, 214.1, 215.1, 415/191, 209.3, 209.4, 210.1, 211.2
See application file for complete search history.

(56) References Cited

U.S. PATENT DOCUMENTS

| | | | |
|---|---|---|---|
| 4,492,078 A | 1/1985 | Williamson | |
| 4,987,736 A * | 1/1991 | Ciokajlo et al. | 60/797 |

(Continued)

FOREIGN PATENT DOCUMENTS

GB    1506952 A    4/1978

OTHER PUBLICATIONS

International Search Report for corresponding International Application PCT/SE2009/000237.

*Primary Examiner* — Andrew Nguyen
(74) *Attorney, Agent, or Firm* — Bejin Bieneman PLC (57) ABSTRACT

A supporting structure for a gas turbine engine includes at least one annular member, and a plurality of circumferentially spaced elements that extend in a radial direction of the annular member and that are connected to the annular member. At least one of the circumferentially spaced elements has an airfoil shape in cross section. The annular member includes at least two substantially flat panel segments that are arranged side by side in a circumferential direction of the annular member. The panel segments are connected to each other in a connection region that extends along facing end parts of the two panel segments. The airfoil shaped element is connected to the annular member at the connection region. A mean camber line of the airfoil shaped element at least along a portion of its length is inclined in relation to an axial direction of the annular member, and the connection region at least along a portion of its length is inclined in relation to the axial direction of the annular member. The inclined portion of the connection region is directed substantially in parallel to the inclined portion of the mean camber line of the airfoil shaped element. A gas turbine engine including a supporting structure of the above type is also provided.

11 Claims, 5 Drawing Sheets

(56) References Cited

U.S. PATENT DOCUMENTS 5,249,418 A * 10/1993 Finn ................................ 60/797

5,483,792 A * 1/1996 Czachor et al. ................. 60/796
2010/0266399 A1 * 10/2010 Hansen et al. ............. 415/209.1

* cited by examiner

SUPPORTING STRUCTURE FOR A GAS TURBINE ENGINE

BACKGROUND AND SUMMARY

This invention relates to a supporting structure for a gas turbine engine, said structure comprising at least one annular member, and a plurality of circumferentially spaced elements that extend in a radial direction of the annular member and that are connected to the annular member, wherein at least one of said circumferentially spaced elements has an airfoil shape in cross section, wherein the annular member comprises at least two substantially flat panel segments that are arranged side by side in a circumferential direction of the annular member, wherein said panel segments are connected to each other in a connection region that extends along facing end parts of the two panel segments, and wherein said airfoil shaped element is connected to the annular member at the connection region. The invention also relates to" a gas turbine engine comprising such a supporting structure.

An axial gas turbine engine generally comprises an air inlet, a compressor section, a fuel combustion chamber, a turbine section, one or several rotatable drive shafts connecting corresponding compressors and turbines, an exhaust outlet and structures for supporting the drive shafts and for mounting the engine to e.g. an aircraft.

Typically, such supporting structures are static parts that include an inner shell, for receiving bearings and drive shaft, and an outer shell, for connection to e.g. an engine casing, and where circumferentially distributed struts extend between and connect the shells. An axial air flow through the engine is allowed to flow between these struts which normally are aerodynamically designed.

Supporting structures of the type discussed here are exposed to rather extreme balance loads and thermally generated loads. As exemplified in U.S. Pat. No. 4,492,078 and GB 1506952 it is well known to, in order to improve resistance to deformation, give the outer shell a polygonal shape by arranging a number of rectangular plates side by side in a circumferential manner, wherein the struts are connected to the outer shell along the corner lines of the polygon.

Although such polygonal supporting structures work very well in general, it is still a need to improve the design to further extend the lifetime of the structures, to reduce the service frequency and to increase safety.

It is desirable to provide a supporting structure for a gas turbine engine that exhibit improved strength properties compared to conventional supporting structures.

The inventive supporting structure, according to an aspect thereof, is characterized in that a mean camber line of said airfoil shaped element at least along a portion of its length is inclined in relation to an axial direction of the annular member, and in that also said connection region at least along a portion of its length is inclined in relation to the axial direction of the annular member, wherein the inclined portion of the connection region is directed substantially in parallel to the inclined portion of the mean camber line of said airfoil shaped element.

The term mean camber line refers to the locus of points halfway between the side surfaces of the airfoil shaped element as measured perpendicular to the mean camber line itself.

The term connection region refers to a long and narrow region in which the two panel segments are connected and in which the airfoil shaped element is connected to the annular member. Because there is commonly a certain rounding of the corner between the two panel segments and because the airfoil shaped element has a certain width (that in addition varies in the axial direction of the annular member), it is difficult to give the exact dimensions of the connecting region. However, its direction of extension is defined in that it is defined to extend along the facing end parts of the two panel segments, which means that it is substantially parallel to an imaginary line formed at the theoretical intersection between the two adjacent panel segments. Roughly, it can be said that the connection region follows the corner between the two panel segments.

In the inventive supporting structure, the panel segments are designed and arranged in such a way that the connection region does not only extend in an axial direction but partly also in a circumferential direction. Figuratively speaking, it can be seen as if a rear, downstream part of the annular member is somewhat twisted or rotated along the engine axis in relation to a front, upstream part. The inventive way of letting the panel segments form a connection region that is inclined in relation to the axial direction has the effect that the connection region, at least to some degree, follows the curved and/or inclined profile of the airfoil shaped element.

Conventionally, the connection regions of polygonal supporting structures are aligned with the common axis. Axially inclined or curved airfoil shaped elements can not be secured to such a connection region without deviation. If an axially inclined and curved element still is connected along a conventional, axially aligned connection region, it will typically be well centered to the connecting region at a mid section of this region but deviate in opposing directions at a forward, upstream section and at an aft, downstream section.

Thus, the trailing and leading edges of the airfoil shaped element will typically be displaced a certain distance in a circumferential direction in relation to the connection region and thus also in relation to the theoretical corner lines, i.e. the ideal polygon centers, of the polygon corners. This displacement has the potential of introducing a number of structural problems, for instance a local bending moment at the leading edge that a polygonal shaped outer annular member is not capable of withstanding. A bending moment of such a magnitude results in a wave formed annular member with worsened strength properties.

Traditionally, these potential problems have not been paid much attention to because the radial elements commonly used have been either axially aligned or only slightly inclined so that any negative effects have been possible to ignore (or have not even been recognized).

An advantageous effect of the inventive design of letting also a portion of the connection region be inclined in relation to the axial direction is that it allows reduction of the distance in which the leading and/or trailing edge of the airfoil shaped element is circumferentially displaced in relation to the ideal corner or polygon center. In turn this has the effect of improving the strength properties by e.g. eliminating or at least reducing the bending moment.

Next generation jet engines will most likely incorporate a more efficient turbine to meet demands for fuel efficiency. In the development of such future gas turbine engines for aircraft propulsion, it is therefore of interest to put more aerodynamic load into the turbine exit guide vanes. This will require an increased curvature of the airfoil shaped elements which will make traditional, axially aligned polygonal shrouds less effective from a structural point of view. The more the curvature of the airfoil shaped elements, the higher the importance of axially inclining the connection region.

In an embodiment of the invention said airfoil shaped element has a cambered shape. Preferably, said inclined portion of the connection region substantially coincides with the mean camber line along a substantial portion of its length. This makes the airfoil shaped element well centered around the connection region.

In a further embodiment of the invention said inclined portion of the connection region follows a substantially straight line. Preferably, said connection region follows a substantially straight line along its entire length. An inclined, straight connection region can be reasonably well fitted also to a curved mean camber line.

In a further embodiment of the invention the annular member comprises a set of substantially flat panel segments and a corresponding set of connection regions, said panel segments being arranged such as to provide at least a portion of the annular member with a polygonal-shaped radial cross section, wherein each connection region corresponds to a corner in said polygonal-shaped radial cross section.

In a further embodiment of the invention the supporting structure comprises an outer annular member and an inner annular member for receiving a turbine drive shaft, wherein the outer annular member and the inner annular member are concentrically arranged around a common axis, and wherein the circumferentially spaced elements extend between and connect the outer and inner annular members), wherein the outer annular member and/or the inner annular member is provided with said panel segments.

The invention also relates to a gas turbine engine comprising a supporting structure of the above type. In a further embodiment of the invention, the gas turbine invention is arranged for propulsion of an aircraft.

BRIEF DESCRIPTION OF DRAWINGS

In the description of the invention given below reference is made to the following figure, in which.

DETAILED DESCRIPTION

Figure 1:
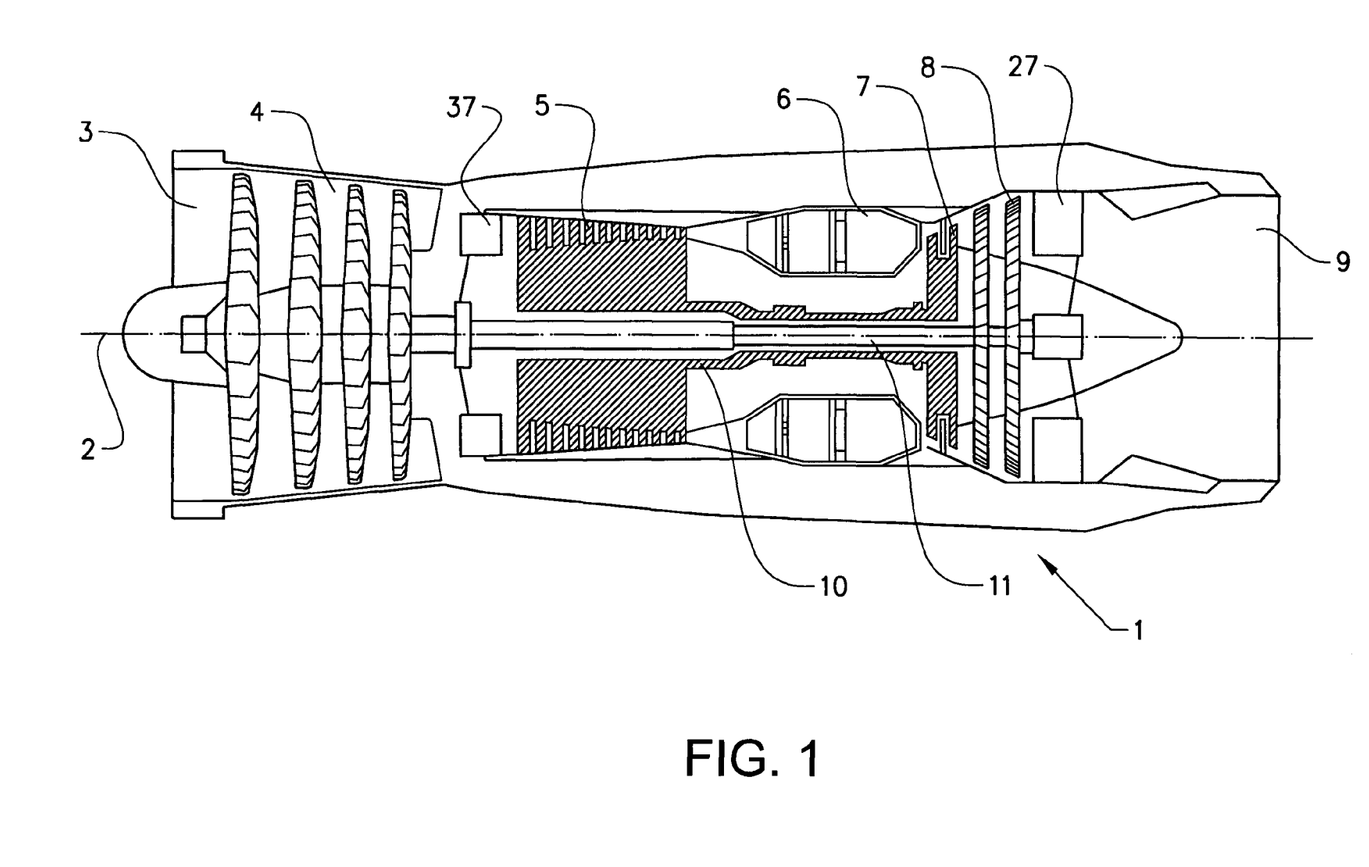
FIG. 1 shows, in a schematic overview, an axial flow aircraft gas turbine engine provided with a supporting structure according to the invention.

FIG. 1 shows, in a schematic overview, an axial flow aircraft gas turbine engine 1 provided with supporting structures 27, 37 according to the invention. In general, the gas turbine engine 1 shown in FIG. 1 is of conventional construction and comprises, in axial flow series, an air intake 3, a low pressure compressor 4, a high pressure compressor 5, combustion equipment 6, a high pressure turbine 7, a low pressure turbine 8 and an exhaust outlet 9. During operation, the high pressure compressor 5 is driven by the high pressure turbine 7 via a first hollow shaft, the high pressure (HP) turbine shaft 10. Similarly, the low pressure compressor 4 is driven by the low pressure turbine 8 via a second hollow shaft, the low pressure (LP) turbine shaft 11, which is coaxially disposed within the first turbine shaft 10. A common axis 2 is also shown.

The gas turbine engine 1 operates, in general, in a conventional manner whereby air drawn in through the air intake 3 is compressed by the low pressure compressor 4 before passing into the high pressure compressor 5 where it is further compressed. The compressed air then flows into the combustion equipment 6 where it is mixed with fuel and the mixture combusted. The resultant hot combustion products then expand through the high and low pressure turbines 7, 8 before being exhausted to the atmosphere through the exhaust outlet 9.

The engine 1 further comprises a rear supporting structure 27 and a front supporting structure 37 for supporting the drive shafts and for mounting the engine to an aircraft.

In the following the invention will mainly be described with reference to the rear supporting structure 27. Such a supporting structure is commonly referred to as Turbine Rear Frame (TRF), Turbine Exhaust Case or Tail Bearing Housing.

Generally, rear support structures in jet engines support one or two shafts by means of roller bearings, i.e. only radial load is transmitted through the structure (axial load only at shaft fwd bearing). The load is transmitted through an inner support structure (support cone) to an inner hub connected to an outer structure (shroud) by means of radial "spokes". In order to reduce aerodynamic drag or to straighten the outlet angle of the main gas flow leaving the low pressure turbine, these "spokes" are usually covered with an airfoil structure or made integral to the structure. Integrated airfoils or vanes are here called "struts". Struts are capable of supporting both aerodynamic loads as well as a combination of structural and thermal induced loads. Most of the modern jet engines utilize such struts in ring-strut-ring components, such as the rear supporting structure 27.

Figure 2:
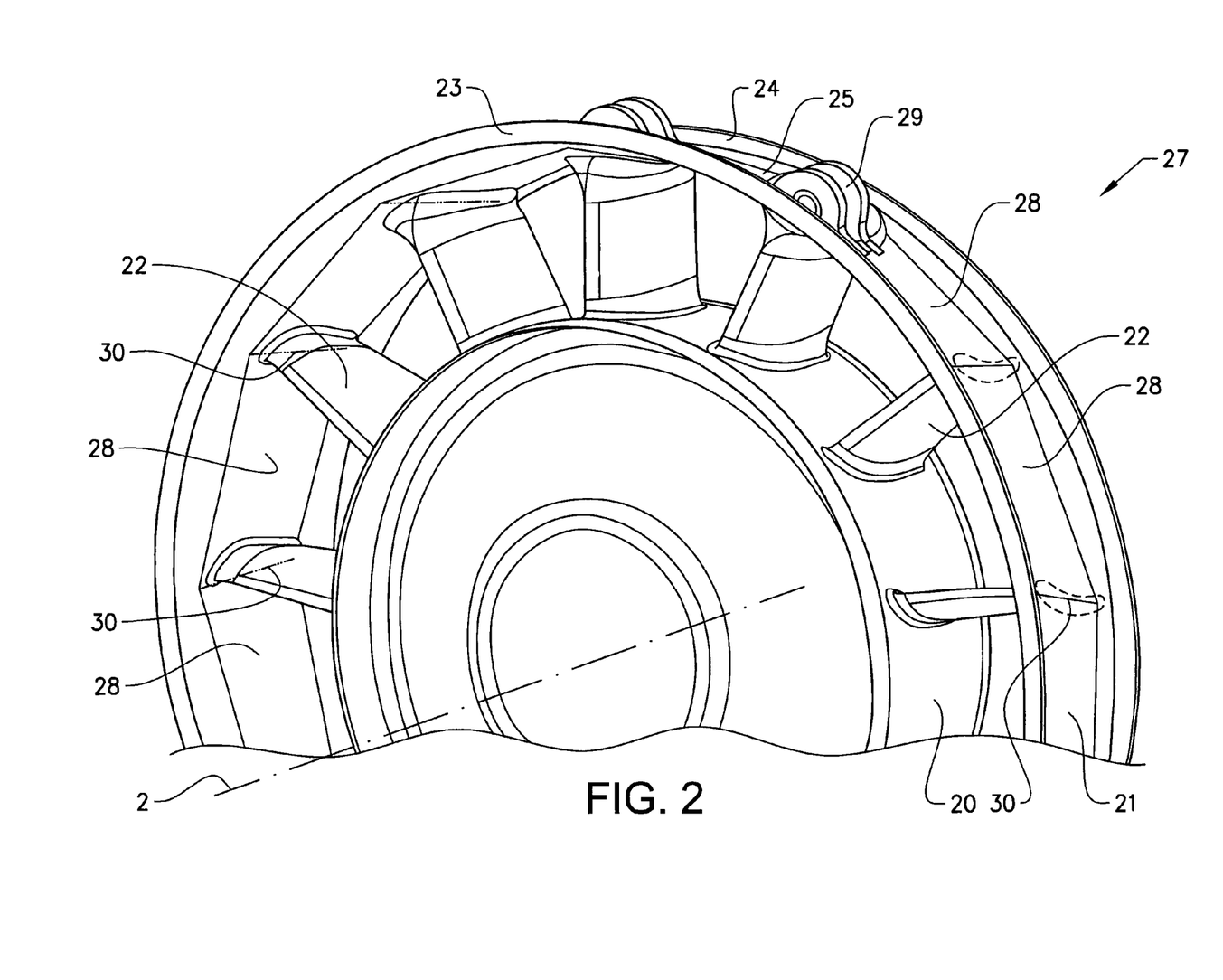
FIG. 2 shows, in a perspective partial view, an embodiment of the inventive supporting structure.

FIG. 2 shows a first embodiment of the inventive rear supporting structure 27 comprising an inner annular member 20 in the form of an inner housing or hub for receiving the second turbine drive shaft 11 and an outer annular member 21, wherein the two annular members 20, 21 are concentrically arranged around the common axis 2. The supporting structure 27 further comprises a plurality of circumferentially spaced elements 22 that extend in a radial direction and connect the inner and outer annular members 20, 21. The radial elements 22 define gas flow passages and, in the example shown, each radial element 22 has an airfoil shape in cross section and is structurally integrated in the supporting structure 27. Thus, the radial elements 22 form what is above referred to as "struts".

The outer annular member 21 comprises a circular, forward (upstream) flange 23, a circular aft (downstream) flange 24, and a central part 25 positioned between the flanges 23, 24. The central part 25 comprises a set of substantially flat panel segments 28 that are arranged side by side in a circumferential direction of the outer annular member 21 such as to provide the outer annular member 21 with a polygonal-shaped radial cross section. Thus, a flat side of the flat panel segments 28 is arranged to be relatively close to perpendicular to a radial direction of the outer annular member 21. In the example shown the panel segments 28 are slightly inclined in relation to the common axis 2 in that an aft (downstream) part of the panel segments 28 is located closer to the common axis 28 than a forward (upstream) part of the same panel segment 28.

Panel segment connection regions 30 are formed in regions between two adjacent panel segments 28, i.e. in the regions where two adjacent panel segments 28 meet. These connection regions 30 thus extend along facing end parts of two adjacent panel segments 30. A general direction of extension of these connection regions 30 is along the axial direction of the outer annular member 21 such that each of the connection regions 30 forms a corner in the polygonal-shaped radial cross section of the outer annular member 21. However, as will be further described below the inventive connection regions 30 extend also in a circumferential direction, i.e. they are at least partly inclined in relation to the axial direction.

The central part 25 of the outer annular member 21 further comprises a transition area 26 on each side of the polygonal-shaped part, which transition area connects the polygonal-shaped part with the circular flanges 23, 24.

Each of the airfoil shaped radial elements 22 is connected to the outer annular member 21 at and along a corresponding panel segment connection region 30. Each of the airfoil shaped radial elements 22 is also connected to the inner annular member 20, which in this example has a circular radial cross section.

Each connection region 30 has a certain width that e.g. depends on the rounding of the corners formed between adjacent panel segments 28. Nevertheless, the connection regions 30 are here indicated by a relatively thin line.

FIG. 2 shows further that the supporting structure 27 is provided with mount tugs 29 for the purpose of mounting the engine to e.g. a wing of an aircraft.

Figures 3, 4:
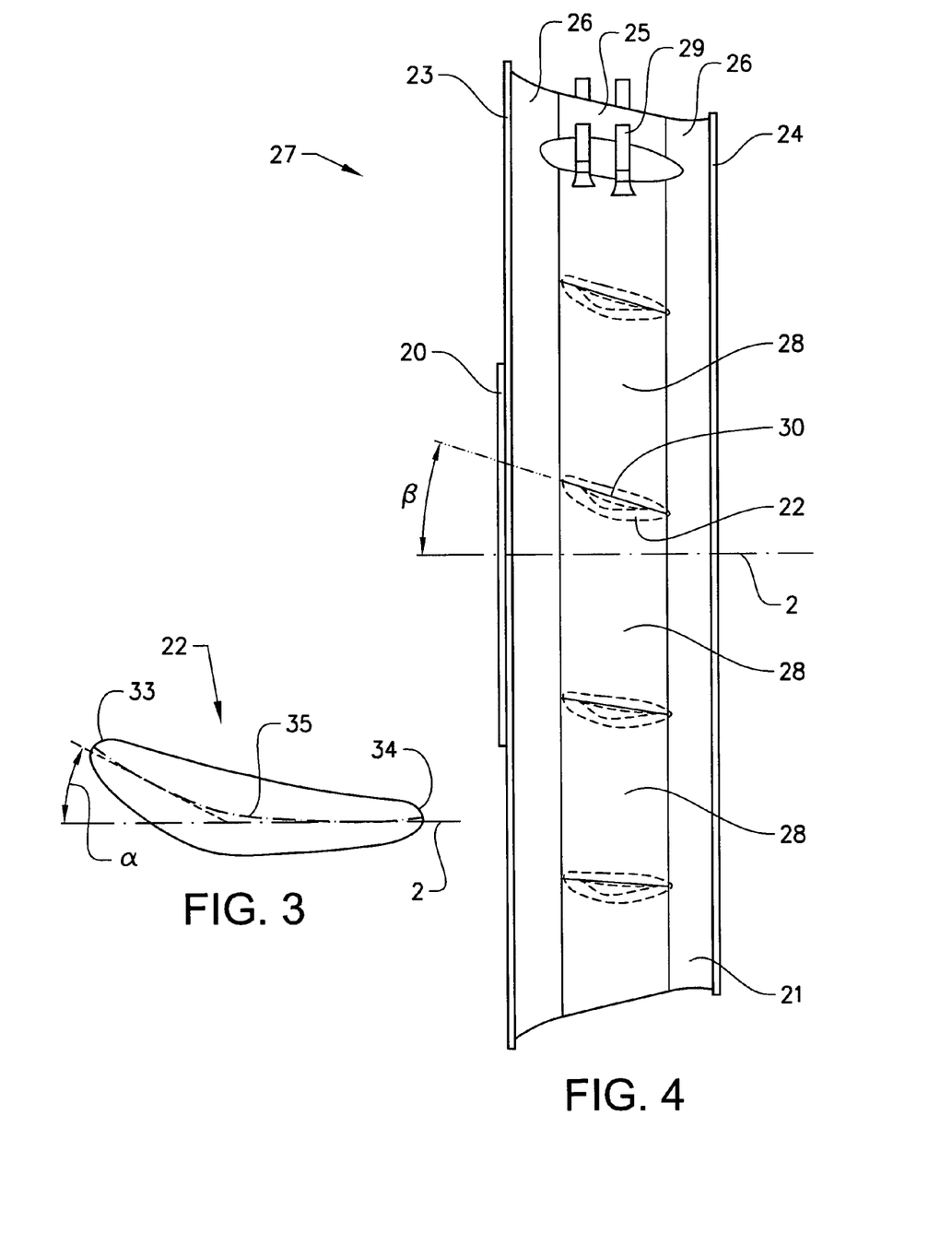
FIG. 3 shows a radial cross section of an airfoil shaped element.
FIG. 4 shows a side view of the supporting structure shown in FIG. 2.

FIG. 3 shows a cross section of one of said airfoil shaped, radial elements 22. As can be seen in FIG. 3, the element 22 has an airfoil shape in cross section with a leading edge 33 to be positioned in an upstream direction (i.e. towards the left in FIG. 1) and a trailing edge 34 to be positioned in a downstream direction (i.e. towards the right in FIG. 1). A mean camber line 35 of the radial element 22 has been indicated. The mean camber line is defined as the locus of points halfway between the side surfaces of the airfoil shaped element as measured perpendicular to the mean camber line itself.

In this example, the radial element 22 has a cambered shape, i.e. the airfoil is asymmetric. The mean camber line 35 follows in this case a curved line between the leading edge 33 and the trailing edge 34. According to an alternative embodiment, the airfoil shaped element 22 has a symmetric airfoil shape. In that case, the mean camber line 35 follows a substantially straight line between the leading edge and the trailing edge of the airfoil shaped element 35.

As can be seen in FIG. 3, the mean camber line 35 of said airfoil shaped element 22 is, at least along a portion of its length, inclined in relation to an axial direction of the annular member 21. This is indicated in FIG. 3 by an angle $\alpha$ that is formed between the mean camber line 35 and the common axis 2 of the outer annular member 21. Since the mean camber line 35 in this case is curved, the inclination $\alpha$ varies along the mean camber line 35.

FIG. 4 shows a side view of the supporting structure 27 shown in FIG. 2. FIG. 4 indicates the shape of the radial cross section of the airfoil shaped elements 22 as well as the general direction of extension of the panel segment connection region 30. It can be seen that the connection region 30, in this case along its entire length, is inclined in relation to the axial direction of the annular member 21 in a similar way as the mean camber line 35 of the airfoil shaped element 22 (see FIG. 3). The inclination of the connection region 30 in relation to the common axis 2 is indicated with the angle $\beta$.

In a certain point of the mean camber line 35 the inclination angels $\alpha$ and $\beta$ are exactly equal. This means that the connection region 30, which in this case is inclined over its entire length, is directed substantially in parallel to a certain inclined portion of the mean camber line 35.

Figure 5:
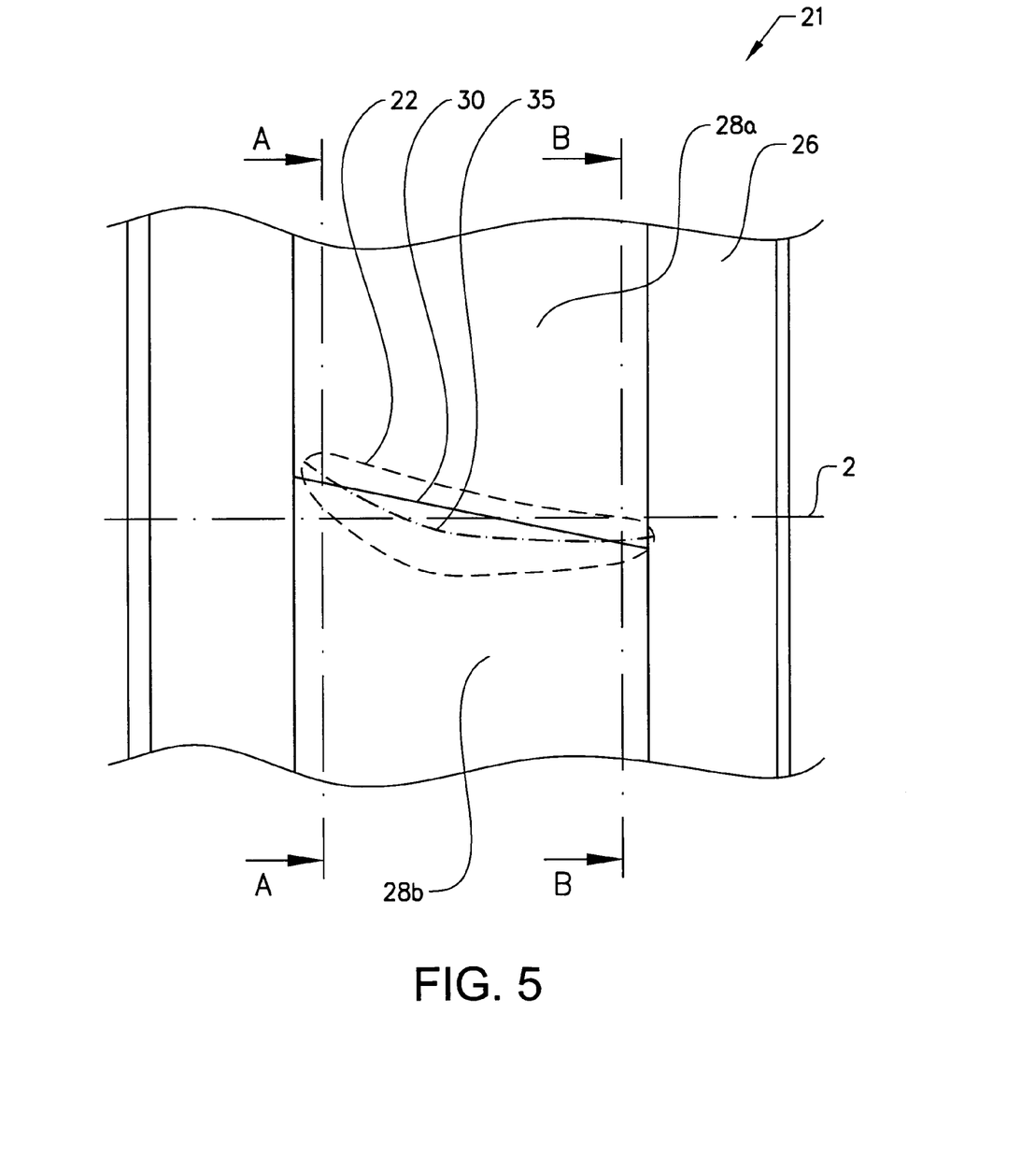
FIG. 5 shows a magnified side view of a part of the supporting structure shown in FIG. 2, and FIGS. 6-7 show schematic and principal cross sections A-A and B-B of the embodiment shown in FIG. 5, as well as corresponding, schematic cross sections for another embodiment of the invention and for prior an supporting structures.

FIG. 5 shows a magnified side view of a part of the supporting structure 27 shown in FIG. 2. What is shown is a part of the outer annular member 21 where one of the airfoil shaped elements 22 is connected. The reference signs are similar to what is described above. In particular, FIG. 5 shows: two panel segments 28a, 28b arranged side by side in a circumferential direction of the outer annular member 21; the connection region 30; the position of the airfoil shaped element 22; the camber line of the airfoil shaped element 35; and the common axis 2.

Figure 6A:
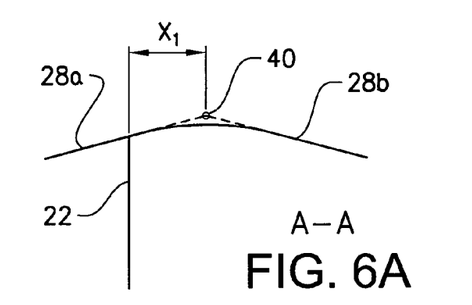
Figure 6B:
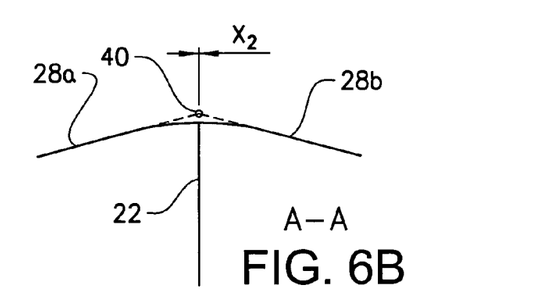
Figure 6C:
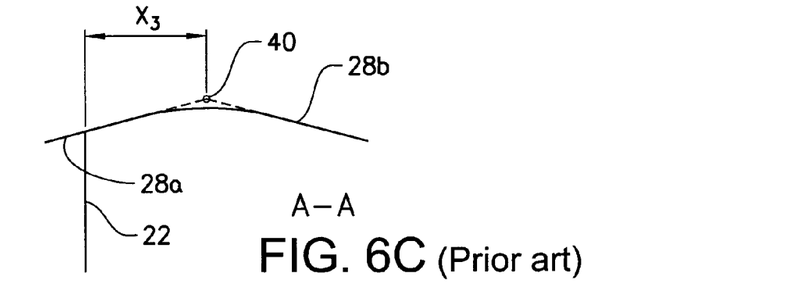
Figure 7A:
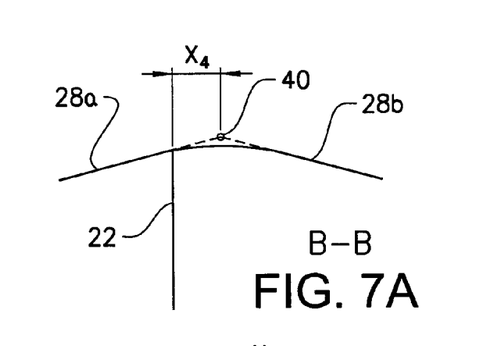

FIGS. 6A and 7A show schematic and principal cross sections A-A and B-B, respectively, of the part shown in FIG. 5. In FIGS. 6A and 7A the position of the airfoil shaped element 22 has been indicated with a simple line. This line can be seen as representing a point of the mean camber line 35. Section A (FIG. 6) relates to a forward section and thus to the leading edge 33 of the airfoil shaped element 22, and section B (FIG. 7) relates to an aft section and thus to the trailing edge 34 of the airfoil shaped element 22.

A theoretical point of intersection between the two adjacent panel segments 28a, 28b in the particular section shown, i.e. a theoretical corner in a radial cross-section of the polygonal-shaped structure, has been indicated with a ring 40. In the embodiment shown the connection region 30 follows a substantially straight line and is inclined in relation to the common axis 2, i.e. to the axial direction of the annular member 21, along its entire length. FIGS. 6A and 7A have been rotated such that the theoretical point of panel intersection 40 is placed centrally on top in both cases.

FIGS. 6A and 7A further show circumferential distances $x-i$, $X4$ between the airfoil shaped element 22 (solid vertical line) and the theoretical point of intersection 40 at, or at least relatively close to, the leading and trailing edges 33, 34 of the airfoil shaped element 22, respectively.

FIGS. 6B-7B and 6C-7C (prior art) are in principal similar to FIGS. 6A-7A with regard to cross sections A-A and B-B, reference signs, theoretical point of intersection, rotation of figures, circumferential distance etc. However, these figures show connection regions that have a different direction of extension compared to what is shown in FIG. 5, i.e. in these cases the adjacent panel segments, or at least the facing end parts of these panel segments, have a different design such that their theoretical line of intersection has a different direction of extension.

Figure 7B:
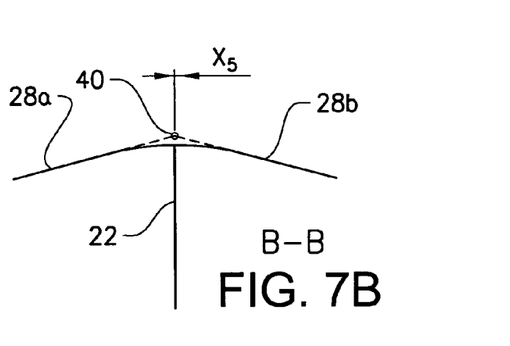

FIGS. 6B and 7B show the corresponding circumferential distances $X2$, $X5$ between the airfoil shaped element 22 and the theoretical point of intersection 40 for another embodiment of the invention in which the connection region substantially coincides with the mean camber line 35 of the airfoil shaped element 22 (see FIG. 5). In the principal view given here, these distances $X2$, $Xs$ become in this embodiment zero, or close to zero.

Figure 7C:
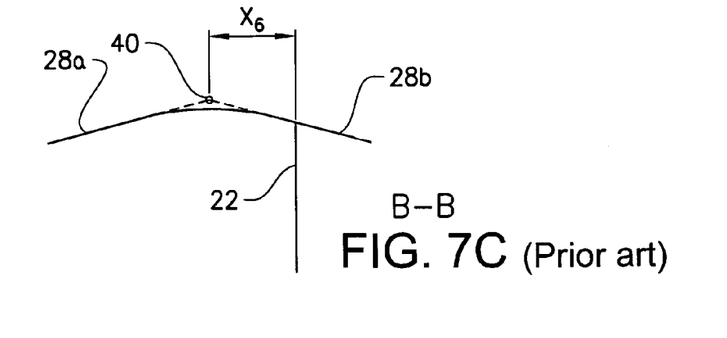

FIGS. 6C and 7C show the corresponding circumferential distances $X3$, $X\beta$ between the airfoil shaped element 22 and the theoretical point of intersection 40 for a connection region according to prior art supporting structures where the connection region is parallel to the common axis 2 (see FIG. 5). With regard to FIG. 7C it may be noted that the airfoil shaped element 22 is placed to the right of the intersection point 40 because the mean camber line 35 has one time crossed the line indicating the common axis 2 (see FIG. 5).

It should be noted that each theoretical point of intersection 40 shown forms a part of a theoretical line of intersection between the two panel segments. The connection region extends along this theoretical line of intersection. This means that a certain circumferential distance x between the airfoil shaped element 22 and a theoretical point of intersection 40 is similar or at least proportional to the circumferential distance between the airfoil shaped element 22 and the connection region 30.

Roughly, the circumferential distances Xi-x6 shown in FIGS. 6-7 correspond to the vertical distance in FIG. 5 between the mean camber line 35 and both the connection region 30 and the line 2 representing the common axis at the A-A and B-B sections. This correspondence is not intended to be exact in FIGS. 6-7. What is intended is to show the principal differences between different embodiments of the invention and between the invention and prior art.

By comparing FIGS. 6A, 6B and 6C it can be seen that X3>X1>X2, which means that the circumferential distance between the airfoil shaped element 22 and the theoretical point of intersection 40, at the leading edge 33 of the air foil shaped element 22, is reduced in the invention as compared to prior art. This reduction is most significant in the second embodiment (FIG. 6B) when the connection region follows the mean camber line 35.

Similarly, by comparing FIGS. 7A, 7B and 7C it can be seen that X6>X4>X5, which means that the circumferential distance between the airfoil shaped element 22 and the theoretical point of intersection 40, at the trailing edge 34 of the air foil shaped element 22, is reduced in the invention as compared to prior art. This reduction is again most significant in the second embodiment (FIG. 6B) when the connection region follows the mean camber line 35.

Accordingly, the airfoil shaped element 22 is, both at its leading and trailing edges, circumferentially displaced to a higher extent in relation to the ideal corner or polygon center in the prior art design compared to the inventive design. In a mid section of the line of intersection between the panel segments, i.e. somewhere in the middle between sections A-A and B-B in FIG. 5, the difference in said circumferential distance between the invention and prior art is less significant. However, as explained below, the deviation in this mid section is less important.

It is of course possible to adjust the inclination of the connection region 30 and its circumferential position in relation to its corresponding airfoil shaped element 22. It is also possible to adjust the circumferential position of the axially aligned prior art connection region in relation to its corresponding airfoil shaped element 22. Such adjustments would lead to corresponding adjustments of FIGS. 6A, 6C, 7A and 7C. For instance, an axially aligned connection region can be adjusted such that the circumferential displacement in relation to the ideal polygon center becomes very small at the trailing edge of the airfoil shaped element (i.e. small X6 in FIG. 7C). However, this would at the same time lead to a very large displacement at the leading edge (i.e. large X3 in FIG. 6C). However, even if such adjustments are made it is still a main point that it is possible to generally reduce the circumferential displacement of the connection region in relation to a polygon ideal center compared to prior art by inclining the panel segment connection region 30 such as to at least partly follow an axially inclined mean camber line 35.

In the following the advantages of the inventive design will be described. Hot gas leaving the turbine(s) in front of the TRF 27 will apply a thermal load to the struts 22. With the struts hotter than the shroud (outer annular member) 21 (which is cool on the outside) the struts will expand due to the thermal expansion in the material resulting in a "punch load" as the strut will try to push (or pry) outwards on the shroud. A TRF with slanted struts (i.e. where the struts are inclined in a radial direction) subjected to a thermal load will reduce the radial punch load by means of rotation as the hub (inner annular member) 20 will rotate relative to the shroud, hence transform some of the radial load to bending.

Both for the radial strut configuration and when using slanted struts, the above described punch load will deform the shroud panels if the load is not acting on the connection line/region between two panels. If there is a significant displacement distance in the circumferential direction between the connection of the airfoil shaped element 22 (the strut) and the connection region, the punch load will hit the panel off center and also introduce a local bending moment that the polygonal shaped shroud is not able to (or designed to) withstand resulting in a wave formed shroud. In case the hub rotates relative to the shroud from thermal load, rotation of the supporting shaft or vibration mode excited in the engine spectrum, the shroud will also show the same wave form.

As the structural load of an engine frame (especially for frames with engine mounts) is very large the struts connecting the hub and the outer annular member must have a certain thickness or width. Generally it must for a given force have large enough area to reduce the structural induced stresses to acceptable levels (stress=force/area). For large aerodynamic work associated with the core flow straightening, the struts must have a width (and curvature), again leading to a deviation from the ideal polygonal shape with a single load application point in the center.

This width of the strut/vane will during bending of vanes introduce a local bending of the flat panels, however minimized if centered around the flat panel intersection. Typical areas with high strain damage in prior art designs with axially aligned connection regions are at the sides of the leading edge of the strut. The inventive design, which increases the centering of the strut around the panel segment intersection, reduces the local bending and said strain damage. In addition, the inventive design makes it possible to increase the flat area of the panel segments.

The invention is applicable to supporting structures wherein either or both the inner annular member (hub) and/or the outer annular member (shroud) has polygonal shaped radial cross section. By reducing the local bending in the shroud panels the invention increases the low cycle fatigue life of the TRF by reducing the thermal induced deformation/damage of the panel, and increases the structural integrity of the component by increasing the stability (or buckling) margin for the mechanical loads.

A polygonal design of the type discussed here is only beneficial if the panels are straight. The inventive design makes the load carrying panels stay more straight during the combined thermal and mechanical loading, hence improving structural integrity and improving stability/buckling margin.

Further, the inventive design makes it possible to decrease the transition area between the round flanges and the polygon shaped part. Thereby, the load carrying flat panels can be wider and therefore possible to make thinner for the same load. Reducing the thickness is an advantage in that the weight can be reduced. Further, the inventive design reduces the curvature needed for connecting the vane to the shroud.

The strain in the deformed shroud is an indirect measure of the low cycle fatigue life of the component. By reducing the local bending the strain in the component is reduced, hence life improved.

It may be noted again that the panel segment connection region 30 does not correspond to a theoretical corner-line of a perfect three dimensional polygon, which polygon according to the invention is slightly twisted in the axial direction of the supporting structure. Instead, the connection region 30 forms a narrow, elongated region that extends along such a theoretical line.

As exemplified in FIGS. 6B and 7B a connection region that follows the mean camber line 35 of a curved airfoil shaped element 22 gives the smallest circumferential displacement. However, a straight connection region, as exemplified in FIGS. 6A and 7A, can in many situations provide a sufficiently small circumferential displacement, and such a straight connection region is likely to be easier to produce since the panel segments can have end parts with straight edges.

The invention is not limited by the embodiments described above but can be modified in various ways within the scope of the claims. For instance, the airfoil shaped elements 22 that extend in the radial direction of the annular member 20, 21 do not have to extend in the radial direction only. Although their main direction of extension is radial, they may be inclined in the radial direction (slanted struts) and/or be inclined in the axial direction.

Further, the invention can be applied also to an inner annular member (hub), or to both the inner and outer annular members, of a supporting structure. The advantageous effects of the invention are similar also when the airfoil shaped element is connected at a connection region that extends along an outer corner of adjacent panel segments, such as the outside of an inner annular member.

The connection region does not necessarily have to either follow a straight line or a curved mean camber line along its entire length. For instance, the connection region can have one portion that is straight and axially inclined and where remaining portions can be axially aligned and/or curved such as to at least partly resemble the shape of a part of a curved camber line. In another example, one portion of the connection region is curved whereas another portion is straight and aligned with common axis.

The invention is not limited to the rear frame structure (TEC/TRF) 27 as exemplified above. It is also applicable to other polygonal shaped structures in a gas turbine engine such as the front frame (inlet frame) 37, an intermediate case (IMC) or a turbine mid structure (TMF1TMS). Further, the invention is applicable to stationary gas turbines (power generators) as well as flying jet engines.

Necessarily not all struts must have equal thickness. It is common that one or more struts are made wider to accommodate an oil tube for the lubrication of the bearing. Further, the round flanges 23, 24 and the transition area 26 are not necessary for the principle of the invention.

In order to provide the annular member 20, 21 with a polygonal-shaped radial cross section the panel segments 28 need to be straight only in the circumferential direction, i.e. between the struts 22. This means that the panel segments 28 may be at least slightly curved in the axial direction of annular member. A way of describing the direction of extension of the inventive connection region 30 is to say that it extends in such a direction that a projection of a first of said connection regions exhibits, at least along a portion of its length, an angle in relation to the common axis 2 when projected onto an imaginary plane defined to coincide with the common axis 2 and to be facing the first connection region.

The invention claimed is:

1. Supporting structure for a gas turbine engine, the structure comprising
    at least one annular member, and
    a plurality of circumferentially spaced elements that extend in a radial direction of the annular member and that are connected to the annular member, wherein at least one of the circumferentially spaced elements has an airfoil shape in cross section, wherein the annular member comprises
    at least two substantially flat panel segments that are arranged side by side in a circumferential direction of the annular member, wherein the panel segments are connected to each other in a connection region that extends along facing end parts of the two panel segments, and wherein the airfoil shaped element is connected to the annular member at the connection region, wherein a mean camber line of the airfoil shaped element at least along a portion of its length is inclined in relation to an axial direction of the annular member, and the connection region at least along a portion of its length is inclined in relation to the axial direction of the annular member, wherein the inclined portion of the connection region is directed substantially in parallel to the inclined portion of the mean camber line of the airfoil shaped element.

2. A supporting structure according to claim 1, wherein the airfoil shaped element has a cambered shape.

3. A supporting structure according to claim 2, wherein the inclined portion of the connection region substantially coincides with the mean camber line along a substantial portion of its length.

4. A supporting structure according to claim 1, wherein the inclined portion of the connection region follows a substantially straight line.

5. A supporting structure according to claim 1, wherein the connection region follows a substantially straight line along its entire length.

6. A supporting structure according to claim 1, wherein the annular member comprises a set of substantially flat panel segments and a corresponding set of connection regions, the panel segments being arranged such as to provide at least a portion of the annular member with a polygonal-shaped radial cross section, wherein each connection region corresponds to a corner in the polygonal-shaped radial cross section.

7. A supporting structure according to claim 1, wherein the supporting structure comprises
    an outer annular member and
    an inner annular member (20) for receiving a turbine drive shaft (11), wherein the outer annular member and the inner annular member (20) are concentrically arranged around a common axis (2), and wherein the circumferentially spaced elements extend between and connect the outer and inner annular members.

8. A supporting structure according to claim 7, wherein the outer annular member is provided with the panel segments.

9. A supporting structure according to claim 7, wherein the inner annular member (20) is provided with the panel segments.

10. Gas turbine engine, wherein it comprises a supporting structure according to claim 1.

11. An aircraft comprising a gas turbine engine comprising a supporting structure according to claim 1.

* * * * *